Sept. 4, 1962  C. W. WENGER  3,052,229
SOLAR HEATERS
Filed April 14, 1958
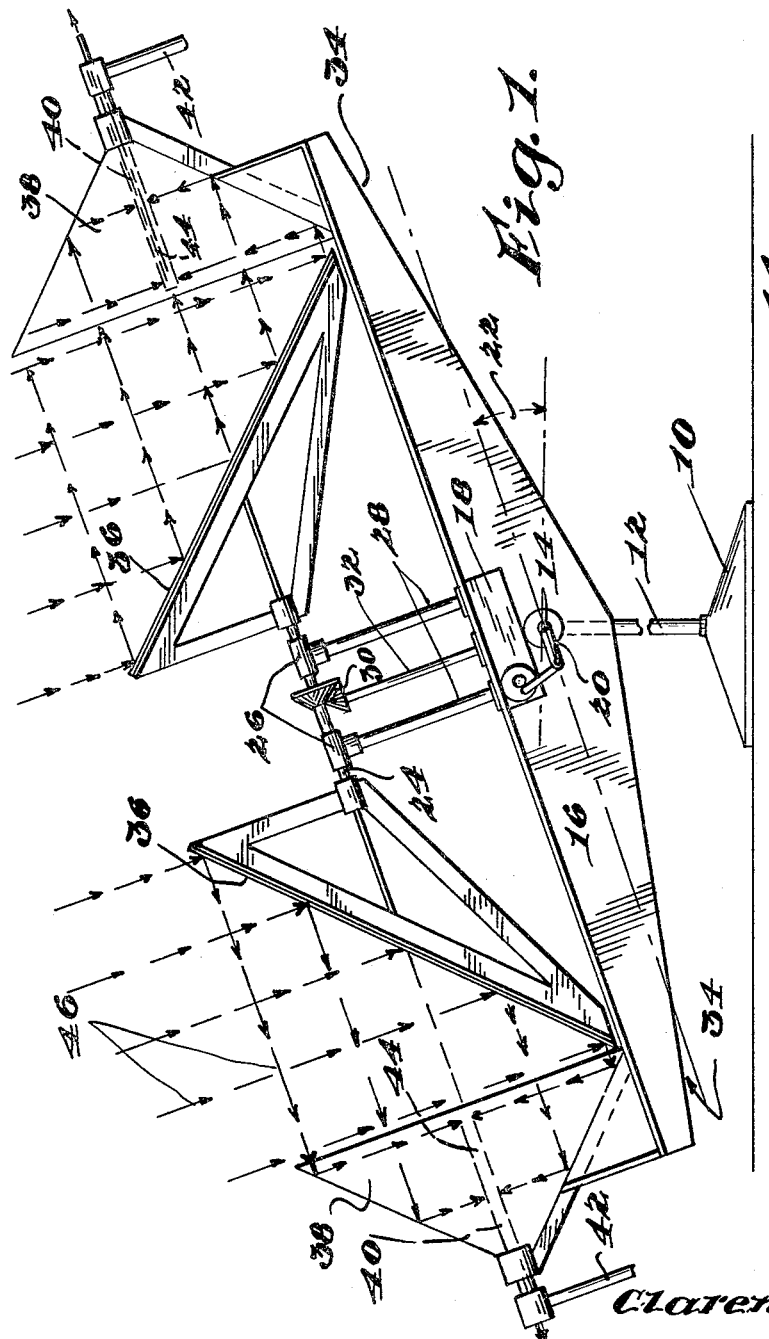
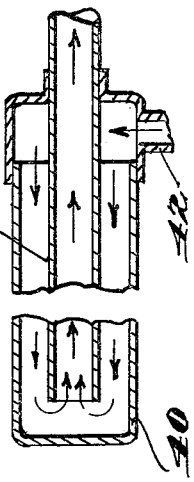
INVENTOR
*Clarence W. Wenger*
BY *Robert van Sickler*
ATTORNEY

3,052,229
SOLAR HEATERS
Clarence W. Wenger, P.O. Box 374, Harrisonburg, Va.
Filed Apr. 14, 1958, Ser. No. 728,133
7 Claims. (Cl. 126—271)

This invention relates to solar heaters in which the energy of sunlight is utilized as the source of heat and particularly an apparatus which may be automatically adjusted for maintaining the component parts in their desired positions regardless of the location of the sun whereby, from sunrise to sunset, the maximum number of heat units may be gathered.

It is therefore an object of my invention to provide means whereby one or more heat transfer units may be mounted on a single carriage.

Another object is to provide pairs of opposed heat reflecting elements, the movement of which may be synchronized with the axially movable carriage or support to accommodate the progressively changing sun travel.

An additional object is to provide means for containing the fluid or air to be heated and the heat transfer elements positioned in such a manner as to receive the maximum amount of heat transferred.

A further object is to provide means for the maximum transfer of heat to the fluid, gas or air being treated for subsequent piping to a suitable radiator system or other types of space heaters.

Still another objective is the provision of an apparatus requiring the minimum number of parts and yet give the manufacturer the widest range with respect to design and material selection.

The various constructional details, manner of operation thereof, and advantages of my invention will be more fully pointed out in the course of the following description, reference being had to the accompanying drawings in which I have shown a single embodiment of my invention, and the latter to be more particularly defined in the appended claims.

FIGURE 1 is a side elevation of my solar heater showing the particular design and arrangement of the component parts.

FIGURE 2 is a sectional detail of a heat transfer element and its connections to its source of supply and outlet.

In the drawings where similar reference characters denote like parts, the numeral 10 refers to the base or stand having a vertical standard 12. Pivotally mounted at 14 is a rigid frame or carriage support 16. A conventional altazimuth motor 18 with the crank lever and disc device 20 are mounted on the carriage 16 to enable alternate tilting or oscillation of the carriage. The platform or carriage frame 16, through the motor 18 and crank lever construction 20, may be alternately tilted or oscillated so that it will follow the sun's orbit, the maximum degree of oscillation being 45 degrees as indicated at 22. In this invention it can be appreciated that the carriage can be arranged to accommodate a plurality of pairs of plane and cone mirrors together with their cooperating heat transfer elements.

A pair of longitudinal shafts 24 are shown journaled in bearings 26 mounted on the ends of vertical standards 28 and operatively connected by gearing 30 to the vertical motor shaft 32 whereby the speed of rotation of the shafts 24 are synchronized and the axis 34—34 of the tiltable carriage is always maintained perpendicular to the sun's seasonal rays.

It will be further understood that the entire device is tiltable and that the mirrors are rotatable so that the angle of incidence of the sun's rays will always be 45 degrees. The angle of reflection should always be 45 degrees and parallel to the cone.

Each optical unit of this solar heater includes a plane mirror 36, a 90 degree right circular cone mirror 38 and a heat transfer element 40 or solar ray collecting tube through which the fluid passing in its conduit and coming from its source of supply circulates. As previously stated, a number of these units may be mounted on a single carriage which carriage may be tiltably supported on the central mounting below the frame.

The plane mirrors 36 are mounted on the shafts 24 to enable them to be rotated in synchronism with the carriage tilting movement and each heat transfer element 40 lies in the axis of its cone mirror and in line with the shaft 24 on which its cooperating plane mirror is mounted. In each unit, the plane mirror 36 stands at an angle of 45 degrees on the outer end of its individual supporting shaft 24.

As indicated by the arrows 46, in any given portion of the carriage, every ray of a sunbeam striking one of the plane mirrors 36 at a 45 degree angle will be reflected toward the inner wall of its cooperative cone mirror 38 and again, toward the axis of the cone so that rays will be concentrated by focusing or directing the solar radiation upon the heat transfer elements 40 along the entire longitudinal length from base to apex.

Therefore, if the apparatus has been properly set up and adjusted for the latitude and longitude of a specific location, just as any astonomical telescope with altazimuth mounting would be, all requirements would be fulfilled for focusing the maximum sunlight energy upon the heat transfer elements at every instant from sunrise to sunset.

The heat transfer tubes or elements 40 are connected at one end to the water, gas or air supply by flexible conduits 42 and extend through the cone from base to apex. It can be understood that the fluid conduits 42 are connected so that adequate movement of the carriage is possible to accommodate its maximum inclination to compensate for variations in the location of the sun from day to day in its orbit of travel from sunrise to sunset. The altazimuth motor, crank device and connecting gearing enable synchronized adjustment as the sun moves in its orbit.

In FIGURE 2, showing a detail of a heat transfer element, the arrows indicate the passage of the fluid or gas coming from its source through the flexible conduit 42 into the outer cylinder and then into the inner conduit 44 where it may be withdrawn for subsequent use or storage. Although no particular material has been identified, any adequate heat retaining conductor may be employed to carry off the heated water, gas or air.

While I have herein shown one specific embodiment of my invention, I wish it to be understood that I do not confine myself to all the precise details herein recited, as there may be many modifications and variations in certain respects without departing from the essential features of the invention or sacrificing any of the advantages thereof.

I claim:

1. A solar heater for utilizing sunlight energy comprising an alternating tiltable support having an altazimuth motor and crank levers mounted thereon, two longitudinal shafts, a pair of plane mirrors mounted respectively on the outer ends of said shafts with their planes at 45 degrees thereto, a pair of 90 degree right circular cone mirrors, each cone mirror being mounted on said support coaxially of the shaft of one of said plane mirrors with its base normal to said shaft and facing said plane mirror, operative connecting gearing for rotating said shafts and plane mirrors mounted on said support, fluid conduits connected to a source of supply, heat transfer elements connected to said conduits and centrally positioned along the axis, in each of said cone mirrors, the radiation from the sun being directed at 45 degrees from the plane mirrors to the cone mirrors and then at 45 degrees to the heat transfer elements for subsequent storage.

2. A solar heater for utilizing sunlight energy comprising an alternating tiltable support having an altazimuth motor and crank levers mounted thereon, two longitudinal shafts, a pair of plane mirrors mounted respectively on the outer ends of said shafts with their planes at 45 degrees thereto, a pair of 90 degree right circular cone mirrors, each cone mirror being mounted on said support coaxially of the shaft of one of said plane mirrors with its base normal to said shaft and facing said plane mirror, operative connecting gearing for rotating said shafts and plane mirrors mounted on said support, fluid conduits connected to a source of supply, heat transfer elements connected to said conduits and centrally positioned along the axis in each of said cone mirrors, the radiation from the sun being directed at 45 degrees from the plane mirrors to the cone mirrors and then at 45 degrees to the heat transfer elements for subsequent storage, and means for moving said tiltable support comprising said altazimuth motor, gearing and crank levers whereby said support and mounted units will be turned to progressively follow the sun in its orbit of travel.

3. A solar heater for utilizing sunlight energy comprising a tiltable support having an altazimuth motor and crank levers mounted thereon, two longitudinal shafts, a pair of plane mirrors mounted respectively on the outer ends of said shafts with their planes at 45 degrees thereto, a pair of 90 degree right circular cone mirrors, each cone mirror being mounted on said support coaxially of the shaft of one of said plane mirrors with its base normal to said shaft and facing said plane mirror, connecting gearing for said shafts mounted on said support, fluid conduits connected to a source of supply, heat transfer elements connected to said conduits horizontally positioned along the axis centrally of each of said cone mirrors, said plane and cone mirrors arranged to enable radiation from the sun to be directed at successive 45 degree angles to said heat transfer elements, and means rotating said shafts and moving said tiltable support comprising said altazimuth motor, gearing and crank levers whereby said support will be positioned to automatically follow the sun's orbit.

4. In a solar heater, a pair of identical optical units mounted on a tiltable common carriage and base assembly, an altazimuth motor and crank lever device operatively mounted on said carriage, a pair of longitudinal shafts, supports for said pair of longitudinal shafts, said optical units having connecting gearing therebetween, each of said optical units comprising a plane and a 90 degree right circular cone mirror, said plane mirrors being respectively mounted on the outer ends of said longitudinal shafts, with their planes at 45 degrees thereto, each cone mirror of an optical unit having the axis thereof coaxial of the shaft of the plane mirror of that unit and having its base facing said plane mirror heat transfer elements respectively horizontally positioned coaxially and centrally of said cone mirrors and extending from base to apex thereof, fluid conduits connected to a source of supply and through said heat transfer elements, means for moving said tiltable carriage and shafts comprising said altazimuth motor, gearing and crank lever device, said means including synchronizing means whereby every sun ray striking the plane mirrors will be reflected toward the inner wall of its cooperating cone mirror at 45 degrees to the plane mirror and then toward the axis of the cones at 45 degrees to the cone surface whereby the rays of the sun will be focused upon the heat transfer elements along their entire length from base to apex.

5. In a solar heater comprising a tiltable support having a pair of longitudinal supporting shafts lying in the same plane with connecting gearing, an altazimuth motor and crank levers, a pair of plane mirrors mounted respectively on the outer ends of said shafts with their planes at 45 degrees thereto, a pair of cone mirrors, each cone mirror being mounted on said support coaxially of the shaft of one of said plane mirrors with its base normal to said shafts and facing said plane mirror, heat transfer elements horizontally mounted along the axis in each of said cone mirrors and extending from base to apex thereof, fluid conduits connected to a source of supply and through said heat transfer elements, the combination of means for moving said tiltable support whereby its axis will always be maintained perpendicular to the sun's rays comprising said altazimuth motor, gearing and crank levers, and said plane and cone mirrors arranged so that every sun ray striking the plane mirrors will be reflected toward the inner wall of its cooperative cone mirror at 45 degrees and then toward the axis of the cones whereby said sun rays will be focused upon the heat transfer elements along their entire length from base to apex.

6. In a solar heater, a reversibly tiltable support having a longitudinal axis and mounted for oscillation about a transverse axis, a plurality of pairs of mirrors, each pair comprising a plane mirror mounted for rotation about an axis parallel to said longitudinal axis with its surface at an angle of 45 degrees to said axis and a cone mirror with its axis coaxial with said axis and its base normal to said axis and facing said plane mirror, a heat transfer element positioned along said axis in each cone mirror, fluid conduits connected to said heat transfer elements, and means for rotating said plane mirrors and for oscillating said tiltable support comprising an altazimuth motor and mechanism connecting said motor to said support so that the longitudinal axis of said support will be maintained perpendicular to the sun rays.

7. In a solar heater, a reversibly tiltable support having a longitudinal axis and mounted for oscillation about a transverse axis, a plurality of pairs of mirrors, each pair comprising a plane mirror mounted for rotation about an axis parallel to said longitudinal axis with its surface at an angle of 45 degrees to said axis and a cone mirror with its axis coaxial with said axis and its base normal to said axis and facing said plane mirror, a heat transfer element positioned along said axis in each cone mirror, fluid conduits connected to said heat transfer elements, and means for rotating each of said plane mirrors about said axis with its plane at 45 degrees to said axis and for oscillating said tiltable support comprising an altazimuth motor and mechanism connecting said motor to said plane mirrors and said support so that the longitudinal axis of said support will be maintained perpendicular to the sun rays and said plane mirrors will be maintained at 45 degrees to the sun rays so that all sun rays reflected by each plane mirror of each pair will be directed toward the reflecting surface of the cone mirror of said pair and then toward the axis of the cone whereby the sun rays will be focused upon the heat transfer elements within the cone mirrors.

References Cited in the file of this patent

UNITED STATES PATENTS

| | | |
|---|---|---|
| 507,999 | Davis | Nov. 7, 1893 |
| 797,891 | Himalaya | Aug. 22, 1905 |
| 1,696,003 | Harvey | Dec. 18, 1928 |
| 2,182,222 | Courtis et al. | Dec. 5, 1939 |